(12) United States Patent
Takeuchi et al.

(10) Patent No.: US 9,289,632 B2
(45) Date of Patent: Mar. 22, 2016

(54) ELECTRICALLY CHARGED FILTER AND MASK

(75) Inventors: Masami Takeuchi, Koga (JP); Yuichirou Takashima, Koga (JP)

(73) Assignee: Japan Vilene Company, Ltd., Tokyo (JP)

(*) Notice: Subject to any disclaimer, the term of this patent is extended or adjusted under 35 U.S.C. 154(b) by 350 days.

(21) Appl. No.: 13/696,536

(22) PCT Filed: May 2, 2011

(86) PCT No.: PCT/JP2011/060546
§ 371 (c)(1),
(2), (4) Date: Nov. 6, 2012

(87) PCT Pub. No.: WO2011/138951
PCT Pub. Date: Nov. 10, 2011

(65) Prior Publication Data
US 2013/0047856 A1 Feb. 28, 2013

(30) Foreign Application Priority Data
May 7, 2010 (JP) .................................. 2010-107601

(51) Int. Cl.
*B03C 3/30* (2006.01)
*A62B 23/02* (2006.01)
*B03C 3/64* (2006.01)
*B32B 5/26* (2006.01)

(52) U.S. Cl.
CPC .................. *A62B 23/025* (2013.01); *B03C 3/30* (2013.01); *B03C 3/64* (2013.01); *B32B 5/26* (2013.01); *B01D 2239/0435* (2013.01); *B01D 2239/0618* (2013.01)

(58) Field of Classification Search
USPC ........................................... 96/17; 128/206.12
See application file for complete search history.

(56) References Cited

U.S. PATENT DOCUMENTS

| | | | | |
|---|---|---|---|---|
| 5,726,107 A | * | 3/1998 | Dahringer et al. | ............ 442/414 |
| 6,119,691 A | * | 9/2000 | Angadjivand et al. | ... 128/206.19 |
| 6,375,886 B1 | * | 4/2002 | Angadjivand et al. | ........ 264/460 |
| 6,406,657 B1 | * | 6/2002 | Eitzman et al. | ............... 264/340 |
| 6,547,860 B2 | | 4/2003 | Buchwald et al. | |
| 6,627,563 B1 | * | 9/2003 | Huberty | .......................... 442/91 |

(Continued)

FOREIGN PATENT DOCUMENTS

| | | |
|---|---|---|
| CN | 1384767 | 12/2002 |
| CN | 1198005 | 4/2005 |

(Continued)

OTHER PUBLICATIONS

International Preliminary Report on Patentability issued on Dec. 10, 2012 for corresponding International Appln. No. PCT/JP2011/060546.
Chinese Office Action issued Jan. 24, 2014 in corresponding Chinese Patent Application No. 201180022570.5.

*Primary Examiner* — Duane Smith
*Assistant Examiner* — Sonji Turner
(74) *Attorney, Agent, or Firm* — K&L Gates LLP

(57) ABSTRACT

Provided is an electrically charged filter which has a high initial filtering efficiency and is not liable to decline in filtering efficiency, by including a liquid-charged nonwoven fabric layer that is charged by application of force via a polar liquid, and a tribo-electrically charged nonwoven fabric layer that is charged by friction between fiber components of a plurality of types.

6 Claims, 7 Drawing Sheets

(56) References Cited

U.S. PATENT DOCUMENTS

| | | |
|---|---|---|
| 7,097,694 B1 * | 8/2006 | Jaroszczyk et al. ............... 96/17 |
| 2002/0121194 A1 * | 9/2002 | Buchwald et al. ................ 96/66 |
| 2004/0177759 A1 * | 9/2004 | Tsai et al. ........................ 96/66 |
| 2007/0045177 A1 | 3/2007 | Tokuda et al. |
| 2008/0276805 A1 * | 11/2008 | Lotgerink-Bruinenberg .... 96/75 |
| 2009/0272269 A1 * | 11/2009 | Leonard .......................... 95/285 |
| 2009/0293279 A1 * | 12/2009 | Sebastian et al. .......... 29/896.62 |
| 2010/0083838 A1 * | 4/2010 | Togashi ............................ 96/10 |
| 2010/0212506 A1 * | 8/2010 | Togashi et al. ................. 96/154 |
| 2011/0209711 A1 * | 9/2011 | Brillat ...................... 128/206.19 |

FOREIGN PATENT DOCUMENTS

| | | | |
|---|---|---|---|
| CN | 1288681 | 12/2006 | |
| FR | 2935272 A1 * | 3/2010 | |
| JP | 2003-524519 | 8/2003 | |
| JP | 2005-029944 | 8/2003 | |
| JP | 2005-029944 | 2/2005 | |
| JP | 2007-092242 | 4/2007 | |
| WO | WO 2010023370 A1 * | 3/2010 | ............. A62B 23/02 |

* cited by examiner

ELECTRICALLY CHARGED FILTER AND MASK

CROSS REFERENCES TO RELATED APPLICATIONS

The present application is a national stage of International Application No. PCT/JP2011/060546 filed on May 2, 2011 and claims priority to Japanese Patent Application No. 2010-107601 filed on May 7, 2010, the disclosure of which is incorporated herein by reference.

BACKGROUND

The present invention relates to an electrically charged filter and a mask provided with an electrically charged filter.

Conventionally, in order to capture dust in the air, a filter made of nonwoven fabric has been used.

A filter of this kind made of nonwoven fabric has been required to have as high a filtering efficiency as possible. The capture of dust in a filter made of nonwoven fabric is principally by means of Brownian diffusion, interception, inertial impaction or the like, based on a physical action. Accordingly, if the diameter of the fibers making up the filter is reduced, smaller dust particles and the like can be captured and removed, and therefore it is possible to increase the dust filtering efficiency.

However, the smaller the diameter of the fibers is made in order to improve the filtering efficiency, the greater the initial pressure loss and hence there have been problems in that air permeability is poor. Furthermore, it is known that as the capture of dust by a filter made of nonwoven fabric progresses, clogging occur due to dust being held in the spaces in the filter, and the pressure loss progressively increases.

Therefore, a filter has been sought which has low initial pressure loss, despite having high filtering efficiency, and which suppresses increase in the pressure loss due to the capture of dust.

As a method for resolving this problem, attempts have been made to improve filtering efficiency, reduce initial pressure loss and suppress increase in pressure loss, by electrically charging a filter made of nonwoven fabric and thus using dust capture based on an electrostatic capturing action in addition to dust capture based on a physical capturing action.

For an electrically charged filter of this kind, an electret body (Patent Literature 1) is known which is obtained by applying an ultrasonic wave to a structure made from thermoplastic resin via a polar liquid. The electret body according to Practical Example 1 disclosed in Patent Literature 1 is obtained by applying an ultrasonic wave to a nonwoven fabric prepared by melt-blowing technology via a polar liquid, and has excellent filtering efficiency of airborne dust particles.

CITATION LIST

Patent Literature

Patent Literature 1: Japanese Patent Application Publication No. 2005-29944 (claims, 0009, 0024, 0036 to 0040)

However, it is known that as the capture of dust by the electrically charged filter progresses, so the electrostatic capturing action declines due to neutralization of the charge of the electrically charged filter, and the filtering efficiency of the electrically charged falter declines.

When the electrically charged capturing action declines, the capture of dust depends mainly on the physical action of the electrically charged filter, clogging occur in the spaces in the filter, and pressure loss increases.

The present applicants carried out thorough research into obtaining an electrically charged filter which has a higher initial filtering efficiency and is less liable to decline in filtering efficiency, than the prior art technology.

Moreover, in a case where the object of filtering by the electrically charged filter includes oil mist, it is known that the charge of the electrically charged filter is neutralized rapidly due to the oil mist adhering to the electrically charged filter, and decline in the filtering efficiency due to the electrostatic capturing action arises rapidly. Furthermore, the decline in the electrostatic capturing action of the electrically charged filter due to neutralization of the electric charge is compensated for by increase in the physical capturing action due to interception of the electrically charged filter as the capture of dust progresses, but in a case where the object of filtering by the electrically charged filter includes oil mist, interception of the electrically charged filter as capture progresses is not liable to occur, and hence decline in the filtering efficiency of the electrically charged filter occurs rapidly.

The present applicants carried out thorough research into obtaining an electrically charged filter more suitable for capturing oil mist than the prior art technology.

SUMMARY

Technical Problem

The present invention was devised in order to overcome the restrictions of the prior art technology described above, an object thereof being to provide an electrically charged filter and a mask in which the initial filtering efficiency is high and decline in the filtering efficiency is not liable to occur.

Solution to Problem

The electrically charged filter according to the present invention includes: a liquid-charged nonwoven fabric layer that is charged by application of a force via a polar liquid; and a tribo-electrically charged nonwoven fabric layer that is charged by friction between fiber components of a plurality of types.

The electrically charged filter may include a plurality of the liquid-charged nonwoven fabric layers and/or the tribo-electrically charged nonwoven fabric layers.

In this case, the liquid-charged nonwoven fabric layer may be located to the upstream side of the tribo-electrically charged nonwoven fabric layer in terms of the air passage direction.

The electrically charged filter can be used to capture oil mist.

The mask according to the present invention includes the electrically charged filter described above.

Advantageous Effects of Invention

The present inventors discovered that the electrically charged filter relating to the present invention has a high initial filtering efficiency and is not liable to decline in filtering efficiency, due to being characterized in having a liquid-charged nonwoven fabric layer that is charged by application of force via a polar liquid, and a tribo-electrically charged nonwoven fabric layer that is charged by friction between fiber components of a plurality of types.

The present inventors discovered that the electrically charged filter has higher initial filtering efficiency and is less liable to decline in the filtering efficiency, due to having a plurality of the liquid-charged nonwoven fabric layers and/or the tribo-electrically charged nonwoven fabric layers.

The present inventors discovered that the electrically charged filter is less liable to decline in filtering efficiency, due to the liquid-charged nonwoven fabric layer being located to the upstream side of the tribo-electrically charged nonwoven fabric layer in terms of the air passage direction.

The present inventors discovered that the electrically charged filter has higher initial filtering efficiency and is less liable to decline in the filtering efficiency, even in cases where the filtering object is oil mist.

The present inventors discovered that a mask including the electrically charged filter relating to the present invention is a mask that has a high initial filtering efficiency and is not liable to produce a decline in filtering efficiency.

Additional features and advantages are described herein, and will be apparent from the following Detailed Description and the figures.

DETAILED DESCRIPTION

Figure 1:
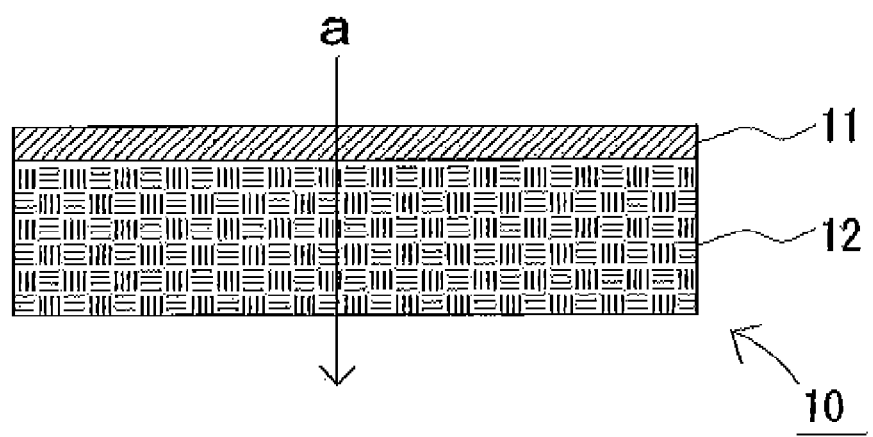
FIG. 1 is a schematic cross-sectional view of an electrically charged filter relating to an embodiment of the present invention.
Figure 2:
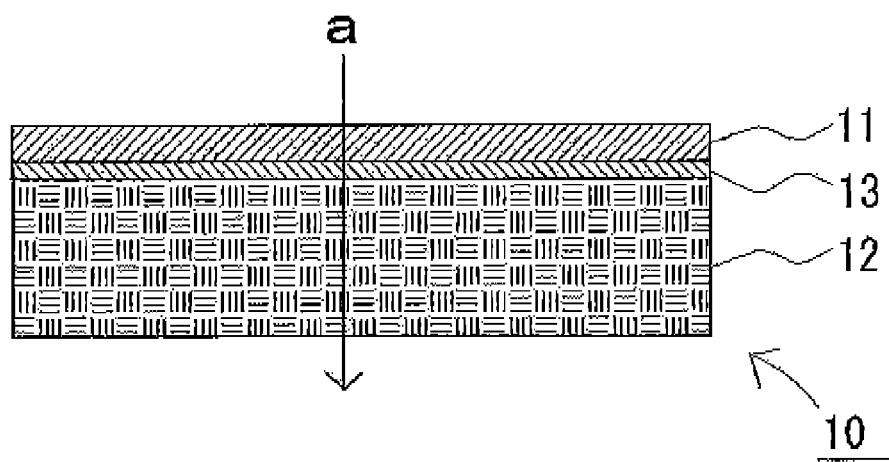
FIG. 2 is a schematic cross-sectional view of an electrically charged filter relating to another embodiment of the present invention.

There follows a description of an electrically charged filter according to an embodiment of the present invention which includes a liquid-charged nonwoven fabric layer (11) that is charged by application of force via a polar liquid, and a tribo-electrically charged nonwoven fabric layer (12) that is charged by friction between fiber components of a plurality of types, with reference to FIG. 1 and FIG. 2.

The electrically charged filter (10) in FIG. 1 is formed by overlaying one layer each of a liquid-charged nonwoven fabric layer (11) and a tribo-electrically charged nonwoven fabric layer (12).

The other electrically charged filter (10) shown in FIG. 2 is formed by overlaying together a two-layer liquid-charged nonwoven fabric layer consisting of a liquid-charged nonwoven fabric layer (11) and another liquid-charged nonwoven fabric layer (13), and a one-layer tribo-electrically charged nonwoven fabric layer (12).

Furthermore, in the electrically charged filter (10) shown in FIG. 1 and FIG. 2, the liquid-charged nonwoven fabric layers (11, 13) are provided to the upstream side of the tribo-electrically charged nonwoven fabric layer (12) in terms of the air passage direction (a), (to the upper side in the plane of the drawing).

The liquid-charged nonwoven fabric layer (11) is constituted by using, as a base, a liquid-charged nonwoven fabric which is charged by applying a force via a polar liquid.

A liquid-charged nonwoven fabric is obtained either by passing a nonwoven fabric made of fibers described below through an electrical charging process (called a liquid charging process below) which applies a force via a polar liquid which is described below, or by electrically charging fibers described below, by passing the fibers through a liquid charging process, and then forming into a nonwoven fabric.

Possible examples of the fibers constituting the liquid-charged nonwoven fabric are commonly known organic polymers, such as: a polyolefin resin (polyethylene, polypropylene, polymethyl pentene, or a polyolefin resin having a structure in which a portion of the hydrocarbon is substituted with a cyano group or a halogen such as fluorine or chlorine, etc.), a styrene resin, a polyvinyl alcohol resin, a polyether resin (polyether ether ketone, polyacetal, modified polyphenylene ether, aromatic polyether ketone, etc.), a polyester resin (polyethylene terephthalate, polytrimethylene terephthalate, polybutylene terephthalate, polyethylene naphthalate, polybutylene naphthalate, polycarbonate, polyarylate, wholly aromatic polyester resin, etc.), a polyimide resin, a polyamide imide resin, a polyamide resin (for example, an aromatic polyamide resin, an aromatic polyether amide resin, a nylon resin, etc.), a resin containing a nitrile group (for example, polyacrylonitrile, etc.), a urethane resin, an epoxy resin, a polysulfone resin (polysulfone, polyether sulfone, etc.), a fluorine resin (polytetrafluoroethylene, polyvinylidene fluoride, etc.), a cellulose resin, a polybenzoimidazole resin, an acrylic resin (for example, a polyacrylonitrile resin copolymerized with an acrylic acid ester or methacrylic acid ester, a modacrylic resin formed by copolymerization of acrylonitrile and vinyl chloride or vinylidene chloride, etc.), and the like.

There are no particular restrictions on these organic polymers, which may be straight chain polymers or branched polymers, and furthermore, the polymer may be a block copolymer or random copolymer, or a mixture of a plurality of organic polymer components, may have a three-dimensional organic polymer structure, and may be crystalline or non-crystalline.

Of this series of organic polymers, when the fibers are composed using organic polymer having a volume resistivity of no less than $10^{14}$ Ω·cm, it is possible to increase the amount of electrical charge on the fibers or nonwoven fabric in the liquid charging process which is described hereinafter, Examples of an organic polymer having a volume resistivity of no less than $10^{14}$ Ω·cm include, for instance: a polyolefin resin (for example, a polyethylene resin, a polypropylene resin, a polymethyl pentene resin, a polystyrene resin, etc.), polyethylene tetrafluoride, polyvinylidene chloride, polyvinyl chloride, polyurethane, and the like.

The "volume resistivity" value referred to in the present specification is a value obtained by measurement on the basis of "General testing methods for thermosetting plastics" as specified in JIS K 6911.

Moreover, in the liquid charging process, it is possible to add to the organic polymer an additive of one or two or more compounds selected from a hindered amine compound, an aliphatic metal salt (for instance, a magnesium stearate, an aluminum stearate, etc.), and an unsaturated carboxylic acid-modified polymer, in order to increase the amount of electrical charge on the fibers or nonwoven fabric.

Of this series of additives, a hindered amine compound may be added to the organic polymer since this enables the amount of electrical charge on the fibers or nonwoven fabric to be increased further.

Specific examples of a hindered amine compound of this kind are: poly [{(6-(1,1,3,3-tetramethyl butyl)imino-1,3,5-triazine-2,4-diyl) {(2,2,6,6-tetramethyl-4-piperidyl)imino} hexamethylene {(2,2,6,6-tetramethyl-4-piperidyl)imino}], dimethyl succinate-1-(2-hydroxyethyl)-4-hydroxy-2,2,6,6-tetramethyl piperidine polycondensation, 2-(3,5-di-t-butyl-4-hydroxyl benzyl)-2-n-butyl malonate bis(1,2,2,6,6-pentamethyl-4-piperidyl), and the like.

The added amount of the additive with respect to the organic polymer is not limited in particular, but may be 0.01 wt % to 5 wt % with respect to the weight of organic polymer. If the content of the additive is less than 0.01 wt %, then the charging effect on the fibers or the nonwoven fabric in the liquid charging process tends to be small, and therefore an added amount of no less than 0.05 wt % may be used. Furthermore, if the content exceeds 5 wt %, then the strength of the fibers or nonwoven fabric made from the organic polymer including the additive tends to decline dramatically, and therefore this content may be set to no more than 4 wt %.

Furthermore, in order to impart functional properties to the fibers or the nonwoven fabric, it is possible to add active carbon, an antibacterial agent, a deodorizing agent, and the like, to the organic polymer.

The fibers described above can be obtained by a commonly known method, such as melt spinning, dry spinning, wet spinning, direct spinning (melt-blowing, a spun-bond process, electro spinning, and so on), a method which extracts fibers from composite fibers, a method which obtains fibers by beating fibers, and so on.

The fibers which constitute the liquid-charged nonwoven fabric may be made from organic polymer of one type, or may be made from organic polymers of a plurality of types. Fibers which are made from organic polymers of a plurality of types are generally called composite fibers and can be presented in various modes, such as core-sheath, sea-island, side-by-side, orange, bimetal, etc.

When the liquid-charged nonwoven fabric is made of fibers having a small average diameter, the liquid-charged nonwoven fabric layer (11) can be formed with a dense structure, and therefore an electrically charged filter (10) having a high physical capacity for capturing dust and oil mist can be obtained.

Therefore, the average diameter of the fibers constituting the liquid-charged nonwoven fabric may be set to no more than 20 μm, no more than 10 μm or no more than 6 μm. The lower limit of the average fiber diameter may be set to no less than 1 μm, no less than 2 μm, or no less than 3 μm, in order to minimize the initial pressure loss when used as an electrically charged filter.

The "average fiber diameter" referred to in the present specification means an arithmetic average (unit: μm) obtained by taking a micrograph at an enlargement of 10,000 to 50,000 times in a cross-section of the thickness direction of the nonwoven fabric and finding the average of the fiber diameter (unit: μm, fiber diameter) in the fiber cross-section at forty sampling points in the micrograph. If the cross-sectional shape of the fibers is not round, then the diameter of a circle having the same cross-sectional area is taken as the fiber diameter.

Moreover, the apparent density of the liquid-charged nonwoven fabric may be set to no more than 100 kg/m$^3$, no more than 80 kg/m$^3$, or no more than 60 kg/m$^3$, in order to restrict increase in the pressure loss due to capture of dust.

This "apparent density" is the calculated value of the weight per cubic meter of the liquid-charged nonwoven fabric layer (11).

Possible examples of the nonwoven fabric made of the fibers described above are: dry nonwoven fabric in which fibers are formed into a nonwoven fabric without using a solvent, wet laid nonwoven fabric in which fibers are formed into a nonwoven fabric by using a solvent, and nonwoven fabric forming by capturing fibers spun using a direct method (melt-blowing, a spun-bond process, electro spinning, or the like).

In particular, when using a direct method, it is possible to reduce the amount of additives which inhibit the charging effect (such as fiber lubricant, dispersant, surfactant, etc.), in the fibers or nonwoven fabric, and a nonwoven fabric can be prepared by unifying the contact points of the fibers without using a binder. In particular, a nonwoven fabric may be prepared by using melt-blowing or electro spinning, or the like, since this makes it possible to obtain a nonwoven fabric having a dense structure.

The liquid-charged nonwoven fabric is prepared by passing fibers or nonwoven fabric obtained as described above through a liquid charging process which is described below.

The liquid charging process is an electrical charging process for fibers or nonwoven fabric which includes at least one electrical charging method selected from the following.

(1) A method of electrically charging fibers or nonwoven fabric by depositing polar liquid and then applying force via the polar liquid.

(2) A method of electrically charging fibers or nonwoven fabric by depositing polar liquid while simultaneously applying force via the polar liquid.

(3) A method of electrically charging fibers or nonwoven fabric by immersing in a polar liquid filled into a container and in this state applying a force via polar liquid.

For the polar liquid, it is possible to use a liquid having low electrical conductivity, such as water, alcohol, acetone, ammonia dissolved in water, and so on. The electrical conductivity referred to here is measured in accordance with JIS K 0101 "Industrial water testing method". In particular, using water as the polar liquid is excellent in terms of the working environment when electrically charging the fibers or nonwoven fabric, and avoiding combustion or ignition during drying in a final stage of preparing the charged fibers or nonwoven fabric.

Furthermore, the temperature of the polar liquid used in the liquid charging process is not limited in particular, provided that the fibers or nonwoven fabric can be electrically charged satisfactorily, and may be set to no more than 40° C.

The method of depositing polar liquid on the fibers or nonwoven fabric may be a method in which the polar liquid is applied in the form of a mist, droplets or flow, or the like, using a spray, shower, nozzle, or the like, and a method of immersing the fibers or nonwoven fabric in the polar liquid may be a method using an immersion apparatus (such as a Rodney Hunt saturator).

Furthermore, there are no particular restrictions on the polar liquid deposition method or immersion method used in this case, provided that the fibers or nonwoven fabric can be electrically charged satisfactorily, and a suitable method may be selected.

The method of applying force may be, for example, a method based on ultrasonic waves, vibration or striking the polar liquid against the fibers or nonwoven fabric in the form of a liquid flow, or the like. If a method of striking the polar liquid in the form of a liquid flow, for instance, striking a water flow, is employed, then it is possible to apply force simultaneously with depositing the polar liquid on the fibers or nonwoven fabric.

If ultrasonic waves are used as a method of applying force to the nonwoven fabric, then there is no creation of holes in the nonwoven fabric, or change in the orientation of the fibers, compared to a case of striking the polar liquid against the fibers or nonwoven fabric.

Furthermore, the strength of the force and the application time of the force applied to the fibers or nonwoven fabric can be adjusted appropriately so as to achieve a large amount of charge on the fibers or nonwoven fabric.

Next, the fibers or nonwoven fabric to which a force has been applied via the polar liquid in this way is passed to a drying process in order to remove the polar liquid.

The apparatus used for a drying process of the fibers or nonwoven fabric may be a commonly known apparatus, such as a can drier or a heated roller, such as a calender, a hot air drier, an electric furnace, a heat plate, or the like. The temperature during the drying process may be set to no more than 120° C., no more than 105° C., or no more than 90° C.

Alternatively, it is also possible to can out a drying process in which the fibers or nonwoven fabric are not heated, for instance, by allowing the fibers of nonwoven fabric to dry naturally without using the drying apparatus described above, or by removing the polar liquid through applying ultrasonic waves or vibration to the fibers or nonwoven fabric, for instance.

The liquid-charged nonwoven fabric is obtained by passing the nonwoven fabric through the liquid charging process described above. Alternatively, the liquid-charged nonwoven fabric is obtained by electrically charging fibers by passing through the liquid charging process described above and then forming the fibers into a nonwoven fabric.

The liquid-charged nonwoven fabric obtained in this way can be used directly as a liquid-charged nonwoven fabric layer (11), but may be formed into the liquid-charged nonwoven fabric layer (11) by passing through post-processing, such as a shaping process by punching out, a slitting, corrugating process, or the like.

If necessary, the liquid-charged nonwoven fabric layer (11) may also be formed by overlaying a reinforcing material, such as nonwoven fabric, a net, woven material, knitted material, or the like, onto the liquid-charged nonwoven fabric, and then carrying out post-processing.

If the liquid-charged nonwoven fabric is reinforced by a reinforcing material, then the shape stability of the liquid-charged nonwoven fabric in the subsequent processing steps is raised, the strength of the obtained liquid-charged nonwoven fabric is improved, and the liquid-charged nonwoven fabric becomes easier to handle. In this case, the reinforcing material may be overlaid on the upstream side of the liquid-charged nonwoven fabric in terms of the air passage direction (a) (the upper side in the plane of the drawing), or on the downstream side of the liquid-charged nonwoven fabric in terms of the air passage direction (a) (the lower side in the plane of the drawing), provided that an electrically charged filter (10) can be prepared in a satisfactory manner.

For the reinforcing material, it is possible to use a reinforcing material which is not liable to give rise to decline in the filtering efficiency of the electrically charged filter, due to having a small adhering amount of surfactant, or the like, which degrades the charging characteristics. For example, it is possible to use a spun-bond nonwoven fabric as a reinforcing material, since it has a small adhering amount of surfactant, or the like.

Moreover, if necessary, it is also possible to form the liquid-charged nonwoven fabric layer (11) by overlaying a functional properties imparting material, such as nonwoven fabric, a net, woven material or knitted material, to which an antibacterial agent, active carbon, deodorising agent, or the like, has been added, onto the liquid-charged nonwoven fabric, and then carrying out post-processing.

There are no particular restrictions on the thickness of the liquid-charged nonwoven fabric layer (11), provided that it is possible to prepare the electrically charged filter (10) satisfactorily, and the thickness can be adjusted appropriately, The magnitude of the filtering efficiency of the electrically charged filter (10) and the resistance to decline in the filtering efficiency as a result of the electrostatic capturing action are affected by the amount of charge in the liquid-charged nonwoven fabric layer (11), and the amount of charge in the liquid-charged nonwoven fabric layer (11) is affected by the weight per unit area (basis weight) of the liquid-charged nonwoven fabric, and the surface area of the liquid-charged nonwoven fabric. However, if the liquid-charged nonwoven fabric layer (11) has densely packed fibers and a high basis weight, then the initial pressure loss of the electrically charged filter (10) is high.

Therefore, the basis weight of the liquid-charged nonwoven fabric layer (11) may be in a range of 10 $g/m^2$ to 120 $g/m^2$, a range of 30 $g/m^2$ to 100 $g/m^2$, or a range of 50 $g/m^2$ to 80 $g/m^2$.

This "basis weight" is a value obtained by calculating a weight per square meter of the liquid-charged nonwoven fabric layer (11).

The tribo-electrically charged nonwoven fabric layer (12) is composed by including fiber components of a plurality of types, and has as a base a tribo-electrically charged nonwoven fabric which is charged by friction between the fiber components of a plurality of types.

The tribo-electrically charged nonwoven fabric is obtained either by passing fibers of a plurality of types made from mutually different fiber components or fiber components of a plurality of types through a processing for charging by friction (called a "frictional charging process" below), and then forming the fibers into a nonwoven fabric, or by forming such fibers into a nonwoven fabric while passing same through a process for charging by friction.

As the component for forming fibers which constitute the tribo-electrically charged nonwoven fabric, it is possible to use, for instance: a polyolefin resin (polyethylene, polypropylene, polymethyl pentene, a polyolefin resin having a structure in which a portion of the hydrocarbon is substituted with a cyano group or a halogen such as fluorine or chlorine, etc.), a styrene resin, a polyvinyl alcohol resin, a polyether resin (polyether ether ketone, polyacetal, modified polyphenylene ether, aromatic polyether ketone, etc.), a polyester resin (polyethylene terephthalate, polytrimethylene terephthalate, polybutylene terephthalate, polyethylene naphthalate, polybutylene naphthalate, polycarbonate, polyarylate, wholly aromatic polyester resin, etc.), a polyimide resin, a polyamide imide resin, a polyamide resin (for example, an aromatic polyamide resin, an aromatic polyether amide resin, a nylon resin, etc.), a resin containing a nitrile group (for example, polyacrylonitrile), a urethane resin, an epoxy resin, a polysulfone resin (polysulfone, polyether sulfone, etc.), a fluorine resin (polytetrafluoroethylene, polyvinylidene fluoride, etc.), a cellulose resin, a polybenzoimidazole resin, an acrylic resin (for example, a polyacrylonitrile resin copolymerized with acrylic acid ester, methacrylic acid ester, or the like, a modacrylic resin formed by copolymerization of acrylonitrile and vinyl chloride or vinylidene chloride, etc.), and the like.

There are no particular restrictions on these organic polymers, which may be straight chain polymers or branched polymers, and furthermore, the polymer may be a block copolymer or random copolymer, or a mixture of a plurality of organic polymer components, may have a three-dimensional organic polymer structure, and may be crystalline or non-crystalline.

Of this series of compounds, when a nonwoven fabric is composed by using fibers made from a polyolefin resin and fibers made from an acrylic resin, a tribo-electrically charged nonwoven fabric having an increased amount of charge is obtained in the friction charging process.

Moreover, when the nonwoven fabric is composed in a mode using fibers made from an acrylic resin which has a substantially circular fiber cross-section, it is possible to achieve a tribo-electrically charged nonwoven fabric which has an even greater amount of charge. In other words, the amount of charge becomes greater when using acrylic resin fibers having a substantially circular cross-section, compared to when using acrylic resin fibers having an irregular pinched cross-section, The acrylic resin fibers having a substantially circular cross-section of this kind can be obtained by spinning using an inorganic solvent, such as nitric acid, aqueous zinc chloride, aqueous calcium chloride, an aqueous solution of a rhodan salt (sodium thiocyanate, potassium thiocyanate, calcium thiocyanate), or the like, as described in detail, for example, in "Senni Binran-Genryo Hen (Fiber Handbook-Raw Materials Edition)" (Society of Fiber Science & Technology, Maruzen Co., Ltd., published October 1970, pp. 727 to 779). Possible examples of an acrylic resin fiber having a substantially circular cross-section are "Exlan" (tradename, made by Japan Exlan Co., Ltd.), "Creslan" (tradename, made by American Cyanamid Co. (US)), "Zefran" (tradename, made by The Dow Chemical Co. (US)), "Courtelle" (tradename, made by Courtaulds Co. (M)), and so on.

As fibers made from another polyolefin resin, it is possible to use fibers made from a resin in which a portion of the polyolefin resin is substituted with a cyano group or halogen. Furthermore, when a phosphorous-based anti-oxidant and a sulfur-based anti-oxidant are included in the polyolefin resin, it is possible to achieve a tribo-electrically charged nonwoven fabric having an even greater amount of charge.

In order to impart functional properties to the fibers or the nonwoven fabric, it is possible to add active carbon, an anti-bacterial agent, a deodorizing agent, and the like, to the organic polymer.

The fibers described above can be obtained by a commonly known method, such as melt spinning, dry spinning, wet spinning, direct spinning (melt-blowing, a spun-bond process, electro spinning, and so on), a method which extracts fibers from composite fibers, a method which obtains fibers by beating fibers, and so on.

The fibers which constitute the tribo-electrically charged nonwoven fabric may also made from organic polymers of a plurality of types. The fibers which are made from organic polymers of a plurality of types are generally called composite fibers and can be presented in various modes, such as core-sheath, sea-island, side-by-side, orange, bimetal, etc.

If the tribo-electrically charged nonwoven fabric is made of fibers of a polyolefin resin and an acrylic resin, there are no restrictions on the mixture ratio thereof, which can be selected appropriately, provided that the amount of charge can be made suitably large by the friction charging process. For example, if a tribo-electrically charged nonwoven fabric is prepared in such a manner that the weight mixture ratio of the fibers made from a polyolefin resin and the fibers made from an acrylic resin is in the range of 30:70 to 80:20, then it is possible to obtain a tribo-electrically charged nonwoven fabric having a suitably large amount of charge by the friction charging process.

The average fineness of the fibers which constitute the tribo-electrically charged nonwoven fabric should be in the range of 1 dtex to 6 dtex, in the range of 1 dtex to 4 dtex, or in the range of 1.5 dtex to 3 dtex, in order to be able to capture dust or oil mist, while also achieving a stable charging state and imparting a large amount of charge in the friction charging process which is described next.

In the friction charging process, if there is a large amount of additive, such as fiber lubricant, or the like, which impedes the charging effect, contained in the fibers or nonwoven fabric, then it is difficult to achieve a tribo-electrically charged nonwoven fabric having an excellent amount of charge. Therefore, the fibers or nonwoven fabric can be washed with warm water, alcohol, or the like, for example, to set the ratio of the additives which impede the charging effect to no more than 0.2 wt % or no more than 0.15 wt % with respect to the weight of fibers, before being supplied to the friction charging process.

There are no particular restrictions on the method used for the friction charging process, provided that it is capable of electrically charging the fibers by friction between the fibers. However, if a carding machine, such as a flat carding or roller carding machine, a garnet machine, or a device based on an air-laying method is employed, friction occurs readily between the fibers, so friction charging is carried out, and the fibers can be formed into a nonwoven fabric to obtain a tribo-electrically charged nonwoven fabric easily.

Furthermore, it is also possible to use the obtained tribo-electrically charged nonwoven fabric directly as the tribo-electrically charged nonwoven fabric layer (12), but a needle punching process may be carried out in order to raise the strength of the tribo-electrically charged nonwoven fabric and also achieve a complementary increase in the friction charging.

Moreover, without carrying out a needle punching process, or before and/or after carrying out a needle punching process, it is possible to create friction between the composed fibers by applying a vibration to the tribo-electrically charged nonwoven fabric, or kneading the tribo-electrically charged nonwoven fabric, and so on.

The reasons why the tribo-electrically charged nonwoven fabric has such an excellent amount of charge are not clear, but it is thought that the occurrence of charging is dependent on friction between the organic polymers of a plurality of types, and this friction between the organic polymers does not occur only on the surface of the nonwoven fabric, but also occurs inside the fabric, which means that charging occurs throughout the whole of the tribo-electrically charged nonwoven fabric.

Therefore, the friction charging process is thought to be capable of applying charge to the nonwoven fabric more efficiently than a charging method which imparts charge mainly to the surfaces of the nonwoven fabric only, such as a plasma charging process or corona charging process, or the like.

The tribo-electrically charged nonwoven fabric obtained in this way can be used directly as a tribo-electrically charged nonwoven fabric layer (12), but may be formed into the tribo-electrically charged nonwoven fabric layer (12) by passing through post-processing, such as a shaping process by punching out, a slitting, corrugating process, or the like. The tribo-electrically charged nonwoven fabric layer (12) may also be formed by carrying out post-processing after overlaying a reinforcing material, such as nonwoven fabric, a net, woven material, knitted material, or the like, onto the tribo-electrically charged nonwoven fabric, as required.

If the tribo-electrically charged nonwoven fabric is reinforced by a reinforcing material, then the shape stability of the tribo-electrically charged nonwoven fabric in the subsequent processing steps is raised, the strength of the obtained tribe-electrically charged nonwoven fabric is improved, and the fabric becomes easier to handle. In this case, the reinforcing material may be overlaid on the upstream side of the tribo-electrically charged nonwoven fabric in terms of the air passage direction (a) (the upper side in the plane of the drawing), or on the downstream side of the tribo-electrically charged nonwoven fabric in terms of the air passage direction (a) (the lower side in the plane of the drawing), provided that an electrically charged filter (10) can be prepared in a satisfactory manner.

For the reinforcing material, it is possible to use a reinforcing material which is not liable to give rise to decline in the filtering efficiency of the electrically charged filter, due to having a small adhering amount of surfactant, or the like, which degrades the charging characteristics. For example, it is possible to use a spun-bond nonwoven fabric as a reinforcing material, since it has a small adhering amount of surfactant, or the like.

Moreover, it is also possible to form the tribo-electrically charged nonwoven fabric layer (12) by carrying out post-processing after overlaying a functional properties imparting material, such as nonwoven fabric, a net, woven material or knitted material, to which an antibacterial agent, active carbon, deodorising agent, or the like, has been added, onto the tribo-electrically charged nonwoven fabric, according to requirements.

There are no particular restrictions on the thickness of the tribo-electrically charged nonwoven fabric layer (12), provided that it is possible to prepare the electrically charged filter (10) satisfactorily, and this thickness can be adjusted appropriately.

The magnitude of the filtering efficiency of the electrically charged filter (10) and the resistance to decline in the filtering efficiency as a result of the electrostatic capturing action are affected by the amount of charge in the tribo-electrically charged nonwoven fabric layer (12), and the amount of charge in the tribo-electrically charged nonwoven fabric layer (12) is affected by the weight per unit area (basis weight) of the tribo-electrically charged nonwoven fabric, and the surface area of the fabric. However, on the other hand, in a mode where the tribo-electrically charged nonwoven fabric layer (12) has densely packed fibers and a high basis weight, the initial pressure loss of the electrically charged filter (10) is higher, and furthermore, there is a risk of poor processability, when the layer is shaped into a mask as described below.

Therefore, the basis weight of the tribo-electrically charged nonwoven fabric layer (12) should be in a range of 60 $g/m^2$ to 400 $g/m^2$, a range of 100 $g/m^2$ to 320 $g/m^2$, or a range of 140 $g/m^2$ to 240 $g/m^2$.

This "basis weight" is a value obtained by calculating a weight per square meter of the tribo-electrically charged nonwoven fabric layer (12).

In the case of an electrically charged filter (10) which has a plurality of liquid-charged nonwoven fabric layers by providing another liquid-charged nonwoven fabric layer (13), as in the electrically charged filter (10) shown in FIG. 2, an electrically charged filter (10) is obtained, which has a larger amount of charge than the electrically charged filter (10) that has one liquid-charged nonwoven fabric layer (11) and one tribo-electrically charged nonwoven fabric layer (12) as in the electrically charged filter (10) shown in FIG. 1, and furthermore, it is possible to achieve an electrically charged filter (10) which has a high initial filtering efficiency and in which decline in the filtering efficiency is not liable to occur.

The other liquid-charged nonwoven fabric layer (13) is composed using a liquid-charged nonwoven fabric as a base, and can be prepared similarly to the liquid-charged nonwoven fabric layer (11).

If there is another liquid-charged nonwoven fabric layer (13) to the downstream side of the liquid-charged nonwoven fabric layer (11) in terms of the air passage direction, as in the electrically charged filter (10) shown in FIG. 2, then the apparent density of the other liquid-charged nonwoven fabric layer (13) can be adjusted appropriately, and may be set to no more than 200 $kg/m^3$, no more than 150 $kg/m^3$, or no more than 100 $kg/m^3$, so as to restrict the increase in pressure loss caused by the capture of dust.

The "apparent density" referred to in the present specification is the calculated value of the weight per cubic meter of the nonwoven fabric.

There are no particular restrictions on the thickness of the other liquid-charged nonwoven fabric layer (13), provided that it is possible to prepare the electrically charged filter (10) satisfactorily, and this thickness can be adjusted appropriately.

The magnitude of the filtering efficiency of the electrically charged filter (10) and the resistance to decline in the filtering efficiency as a result of the electrostatic capturing action are affected by the amount of charge in the other liquid-charged nonwoven fabric layer (13), and the amount of charge in the other liquid-charged nonwoven fabric layer (13) is affected by the weight per unit area (basis weight) of the liquid-charged nonwoven fabric, and the surface area of the fabric. However, if the other liquid-charged nonwoven fabric layer (13) has densely packed fibers and a high basis weight, then the pressure loss in the electrically charged filter (10) is high, and therefore the basis weight of the other liquid-charged nonwoven fabric layer (13) which is positioned to the downstream side of the liquid-charged nonwoven fabric layer (11) described above may be lighter than the basis weight of the liquid-charged nonwoven fabric layer (11).

As shown in FIG. 2, if the electrically charged filter (10) is composed by providing another liquid-charged nonwoven fabric layer (13) to the downstream side of the liquid-charged nonwoven fabric layer (11) (the lower side in the plane of the drawings), air which has been filtered by the liquid-charged nonwoven fabric layer (11) passes through the other liquid-charged nonwoven fabric layer (13), and therefore the amount of dust captured by the other liquid-charged nonwoven fabric layer (13) is smaller than the amount of dust captured by the liquid-charged nonwoven fabric layer (11), and increase in pressure loss due to the capture of dust is not liable to occur in the other liquid-charged nonwoven fabric layer (13).

Consequently, by composing a fabric from fibers having a smaller fiber diameter than the liquid-charged nonwoven fabric layer (11), it is possible to achieve another liquid-charged nonwoven fabric layer (13) which has a higher physical dust capture capability. By adopting a mode of this kind, it is possible to obtain an electrically charged filter (10) which has a higher initial filtering efficiency and less decline in the filtering efficiency.

Therefore, the average fiber diameter of the fibers which constitute the other liquid-charged nonwoven fabric layer (13) that is positioned to the downstream side of the liquid-charged nonwoven fabric layer (11) (the lower side in the plane of the drawing) can be made finer than the fibers which constitute the liquid-charged nonwoven fabric layer (11). In terms of specific numerical values, the average fiber diameter may be set to no more than 10.0 μm, no more than 6.0 μm, or no more than 4.0 μm. The lower limit of the average fiber diameter may be set to no less than 0.5 μm, no less than 1.0 μm, or no less than 1.5 μm, so as to restrict initial pressure loss and increase in the pressure loss due to dust capture when formed into an electrically charged filter (10).

Since the electrically charged filter (10) includes a liquid-charged nonwoven fabric layer (11) and a tribo-electrically charged nonwoven fabric layer (12), then even if a liquid-charged nonwoven fabric having a small basis weight is used for the liquid-charged nonwoven fabric layer (11) with the object of reducing the initial pressure loss, because a tribo-electrically charged nonwoven fabric layer (12) having a very large amount of charge is provided, it is possible to compensate for decline in the physical capture capability of the electrically charged filter (10) by increase in the electrostatic capture capability.

Consequently, it is possible to raise the initial filtering efficiency in the electrically charged filter (10) having a liquid-charged nonwoven fabric layer (11) and a tribo-electrically charged nonwoven fabric layer (12), despite the initial pressure loss can be kept low, and decline in the filtering efficiency due to the capture of dust can be reduced, in addition to which the increase in pressure loss can be restricted.

The respective charged nonwoven fabric layers may be bonded together by bonding means, such as adhesive, fiber bonding, or the like, but it is also possible to compose an electrically charged filter (10) by overlaying together respective charged nonwoven fabric layers, without using bonding means. If using bonding means, when the bonding range is relatively large, there is a risk of causing decline in the filtering efficiency of the electrically charged filter (10), and therefore bonding may be performed locally.

Furthermore, providing the bonding locations at the perimeter of the electrically charged filter (10) makes it less liable to impede the charging efficiency. For example, it is possible to provide either continuous or non-continuous linear bonding sections having a width of 0.1 mm to 5 mm, and in particular to provide either continuous or non-continuous linear bonding sections having a width of 0.5 mm to 3 mm, at the periphery of the electrically charged filter (10).

Bonding by fiber bonding may be carried out by thermal fusion, but if heat is applied to all of the fibers, the charge held in the fibers moves and there are cases where the electrostatic filtering efficiency of the electrically charged filter (10) declines. Therefore, it is possible to use means, such as ultrasonic fusion, or the like.

The charged nonwoven fabric layers can be used directly as an electrically charged filter (10), but may be formed into electrically charged filter (10) by passing through post-processing, such as a shaping process by punching out, a slitting, corrugating process, or the like. Moreover, if necessary, it is also possible to form the electrically charged filter (10) by adding a binder, coating material or function imparting agent (an antibacterial agent, active carbon, deodorising agent, or the like) to the respective overlaid charged nonwoven fabric layers, or overlaying a reinforcing material, such as nonwoven fabric, a net, woven material or knitted material, thereon, and then carrying out post-processing.

If the electrically charged filter (10) is reinforced by a reinforcing material, then the shape stability of the electrically charged filter (10) is increased, the strength thereof is also improved, and the filter becomes easier to handle. In this case, the reinforcing material may be overlaid on the upstream side of the electrically charged filter (10) in terms of the air passage direction (a) (the upper side in the plane of the drawing), or on the downstream side of the electrically charged filter (10) in terms of the air passage direction (a) (the lower side in the plane of the drawing), provided that an electrically charged filter (10) can be prepared in a satisfactory manner.

For the reinforcing material, it is possible to use a reinforcing material which is not liable to give rise to decline in the filtering efficiency of the electrically charged filter, due to having a small adhering amount of surfactant, or the like, which degrades the charging characteristics, For example, it is possible to use a spun-bond nonwoven fabric as a reinforcing material, since it has a small adhering amount of surfactant, or the like.

There are no particular restrictions on the sequence of layers, or the number of charged nonwoven fabric layers which are overlaid, in the respective charged nonwoven fabric layers which constitute the electrically charged filter (10), and this sequence and number can be adjusted appropriately. In the case of an electrically charged filter (10) which includes one liquid-charged nonwoven fabric layer (11) and one tribo-electrically charged nonwoven fabric layer (12), it is possible to achieve an electrically charged filter (10) in which the respective charged nonwoven fabric layers are overlaid in the sequence of the tribo-electrically charged nonwoven fabric layer (12) followed by the liquid-charged nonwoven fabric layer (11), from the upstream side of the electrically charged filter (10) in terms of the air passage direction (a) (the upper side in the plane of the drawing).

In the case of an electrically charged filter (10) which includes two or more liquid-charged nonwoven fabric layers (11, 13) and one tribo-electrically charged nonwoven fabric layer (12), it is also possible to arrange the tribo-electrically charged nonwoven fabric layer (12), the liquid-charged nonwoven fabric layer (11) and the other liquid-charged nonwoven fabric layer (13) in sequence from the upstream side of the electrically charged filter (10) in terms of the air passage direction (a), (the upper side in the plane of the drawing). Furthermore, the composition is not limited to the example given above, and an electrically charged filter (10) can be composed by overlaying the respective charged nonwoven fabric layers in another sequence.

Moreover, in the case of the electrically charged filter (10) includes a plurality of liquid-charged nonwoven fabric layers and a plurality of tribe-electrically charged nonwoven fabric layers, the sequence of lamination of the respective charged nonwoven fabric layers can be adjusted appropriately.

In the case of an electrically charged filter (10) in which the liquid-charged nonwoven fabric layers (11, 13) are located to the upstream side of the tribo-electrically charged nonwoven fabric layer (12) in terms of the air passage (a), as in FIG. 1 and FIG. 2, for example, the liquid-charged nonwoven fabric layers (11, 13) play a main role of capturing dust or oil mist, and therefore it is possible to suppress the neutralization of charge due to capture of dust by the tribo-electrically charged nonwoven fabric layer (12), and decline in the filtering efficiency of the electrically charged filter (10) can be prevented further. Therefore, it is possible to adopt an electrically charged filter (10) in which one or more liquid-charged nonwoven fabric layer is located to the upstream side of the tribo-electrically charged nonwoven fabric layer (12) in terms of the air passage direction (a), and it is also possible to adopt an electrically charged filter (10) in which all of the liquid-charged nonwoven fabric layers are located to the upstream side of the tribo-electrically charged nonwoven fabric layer (12) in terms of the air passage direction (a).

Furthermore, in the case of an electrically charged filter (10) having a plurality of liquid-charged nonwoven fabric layers, an electrically charged filter (10) is obtained in which the pressure loss is not liable to increase, and therefore it is possible to compose the liquid-charged nonwoven fabric layer (reference numeral 11 in FIG. 2) which is located furthest to the upstream side in the air passage direction (a), of the liquid-charged nonwoven fabric layers, from fibers having a larger fiber diameter than any other liquid-charged nonwoven fabric layers (reference numeral 13 in FIG. 2).

For the base material of the mask, it is possible to use the electrically charged filter (10) described above. For the method of manufacturing the mask, it is possible to employ a commonly known method, for example, if the electrically charged filter (10) is used as a base material for a shaping mask, then a mask (1) as shown in FIG. 7 can be formed by shaping the electrically charged filter (10) into a cup shape which covers a portion of the face, including the mouth.

Figure 7:
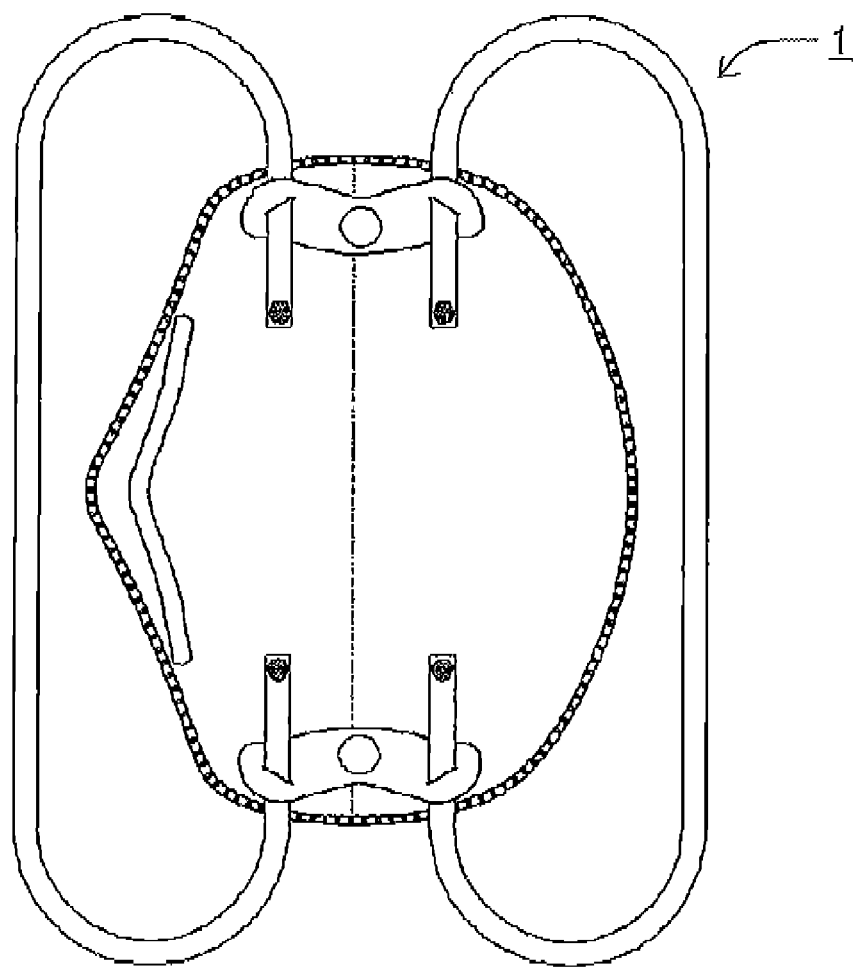
FIG. 7 shows a mask.

If a mask is prepared using a reinforcing material, then it is possible to obtain a mask (1) as shown in FIG. 7 by overlaying the reinforcing material and the electrically charged filter (10) and then shaping, or to obtain a mask (1) as shown in FIG. 7 by overlaying an electrically charged filter (10) on a shaped reinforcing material and then shaping. It is possible to bond the perimeter by sewing, bonding, or the like, either before shaping, simultaneously with shaping or after shaping.

Rather than overlaying a unified electrically charged filter (10) on a reinforcing material, it is also possible to obtain a mask (1) as shown in FIG. 7 by overlaying a liquid-charged nonwoven fabric layer and/or a tribo-electrically charged nonwoven fabric layer, individually, on a reinforcing material which has been shaped or has not yet been shaped, and then shaping.

PRACTICAL EXAMPLES

Below, specific numerical conditions, and the like, for facilitating understanding of the present invention are described by way of example, but the present invention is not limited to these specific conditions, and the design may be changed and modified within the scope of the objects of the present invention.

A-1. Method of Manufacturing Liquid-charged Melt-blown Nonwoven Fabric (A-1)

A commercial hindered amine light stabilizer (Chimassorb 944FDL made by Ciba Speciality Chemicals Co., Ltd.) was mixed at a rate 4 mass % with respect to the total amount of a resin, with a commercial polypropylene resin (Prime Poly Pro made by Prime Polymer Co., Ltd.) having a volume resistivity of approximately $10^{16}$ ($\Omega \cdot$cm), and the mixture was spun by a melt-blowing method to prepare a melt-blown nonwoven fabric (basis weight: 50 g/m², thickness: 0.8 mm, average fiber diameter: 6 μm). The melt-blown nonwoven fabric thus obtained was conveyed into a tank holding a polar liquid consisting of pure water kept to a temperature range of 20±5° C. and having an electrical conductivity of 3.2 (μS/cm) (the pure water corresponding to secondary-distilled water which has been distilled and deionized), so as to support pure water, as well as receiving application of ultrasonic waves having a frequency of 20 kHz. Thereupon, the melt-blown nonwoven fabric to which ultrasonic waves had been applied was dried at 105° C. with a conveyor type drier to obtain a liquid-charged melt-blown nonwoven fabric (basis weight: 50 g/m², thickness: 0.8 mm, A-1).

A-2. Method of Manufacturing Liquid-charged Melt-blown Nonwoven Fabric (A-2)

A liquid-charged melt-blown nonwoven fabric (basis weight: 25 g/m², thickness: 0.3 mm, A-2) was obtained in a similar fashion to A-1, with the exception that a melt-blown nonwoven fabric (basis weight: 25 g/m², thickness: 0.3 mm, average fiber diameter: 3 μm) was prepared by spinning using a melt-blowing method.

B-1. Method of Manufacturing Corona-charged Melt-blown Nonwoven Fabric (B-1)

A corona-charged melt-blown nonwoven fabric (basis weight: 50 g/m², thickness: 0.8 mm, B-1) was obtained by applying corona charging (DC voltage: 15 kV) as a charging process to the melt-blown nonwoven fabric obtained in A-1. The nonwoven fabric was charged by the corona charging process.

B-2. Method of Manufacturing Corona-charged Melt-blown Nonwoven Fabric (B-2)

A corona-charged melt-blown nonwoven fabric (basis weight: 25 g/m², thickness: 0.3 mm, B-2) was obtained by applying corona charging (DC voltage: 15 kV) as a charging process to the melt-blown nonwoven fabric obtained in A-2. The nonwoven fabric was charged by the corona charging process.

C-1. Method of Manufacturing Corona-charged Hydroentangled Nonwoven Fabric (C-1)

A hydroentangled nonwoven fabric (basis weight: 50 g/m², thickness: 0.6 mm) was prepared by opening polypropylene fibers (NF made by Ube Nitto Kasei Co., Ltd., fineness: 2.2 dtex, average fiber diameter: 18 μm, fiber length: 51 mm) in a carding machine and hydroentangling the opened fibers at a water pressure of 15 MPa. A corona-charged hydroentangled nonwoven fabric (basis weight: 50 g/m², thickness: 0.6 mm, C-1) was obtained by applying corona charging (DC voltage: 15 kV) to the obtained hydroentangled nonwoven fabric.

D-1. Method of Manufacturing Tribo-electrically Charged Needle-punched Composite Nonwoven Fabric (D-1)

Polypropylene fibers (NM made by Ube Nitto Kasei Co., Ltd., fineness: 2.2 dtex, fiber length: 51 mm) and acrylic fibers (Exlan K8 made by Japan Exlan Co., Ltd., fineness: 1.7 dtex, fiber length: 51 mm) were washed in warm water at 60° C., adjusted to have an amount of fiber lubricant adhering to the fibers of no more than 0.1% with respect to the fiber weight, and then mixed uniformly to achieve a mixture ratio of (polyolefin fibers:acrylic fibers)=(50 wt %:50 wt %), and dried. A tribo-electrically charged needle-punched composite nonwoven fabric (basis weight: 200 g/m², thickness: 23 mm, D-1) was obtained by forming these mixed fibers into a fiber web, as well as friction-charging the fibers, in a carding machine, overlaying this fiber web on a polypropylene spun-bond nonwoven fabric (Syntex PK103 made by Mitsui Chemical Co., basis weight: 15 g/m²), and carrying out a needle punching process from the fiber web side under needle density conditions of 160 needles per cm².

D-2. Method of Manufacturing Tribo-electrically Charged Needle-punched Composite Nonwoven Fabric (D-2)

A tribo-electrically charged needle-punched composite nonwoven fabric (basis weight 250 g/m², thickness: 2.7 min, D-2) was obtained in a similar fashion to D-1, with the exception that the basis weight of the fiber web overlaid onto the polypropylene spun-bond nonwoven fabric was 250 g/m².

D-3. Method of Manufacturing Tribo-electrically Charged Needle-punched Composite Nonwoven Fabric (D-3)

A tribe-electrically charged needle-punched composite nonwoven fabric (basis weight 180 g/m², thickness: 1.9 mm, D-3) was obtained in a similar fashion to D-1, with the exception that the basis weight of the fiber web overlaid onto the polypropylene spun-bond nonwoven fabric was 180 g/m².

D-4. Method of Manufacturing Tribe-electrically Charged Needle-punched Composite Nonwoven Fabric (D-4)

A tribe-electrically charged needle-punched composite nonwoven fabric (basis weight 275 g/m², thickness: 3.0 mm, D-4) was obtained in a similar fashion to D-1, with the exception that the basis weight of the fiber web overlaid onto the polypropylene spun-bond nonwoven fabric was adjusted.

E-1. Method of Manufacturing Corona-charged Needle-punched Composite Nonwoven Fabric (E-1)

A needle-punched composite nonwoven fabric (basis weight: 200 g/m$^2$, thickness: 2.4 mm) was obtained by forming polypropylene fibers (NM, made by Ube Nitto Kasei Co., Ltd., fineness: 2.2 dtex, fiber length: 51 mm) into a fiber web, in a carding machine, overlaying this fiber web on a polypropylene spun-bond nonwoven fabric (Syntex PK103 made by Mitsui Chemical Co., basis weight: 15 g/m$^2$), and carrying out a needle-punching process from the fiber web side under needle density conditions of 160 needles per cm$^2$. A corona-charged needle-punched composite nonwoven fabric (basis weight: 200 g/m$^2$, thickness: 2.4 mm, E-1) was obtained by washing the needle-punched composite nonwoven fabric thus obtained, in warm water at 30° C., to adjust the amount of fiber lubricant adhering to the fibers to no more than 0.1% with respect to the weight of fibers, and then drying and performing a corolla charging process (DC voltage: 15 kV).

Practical Example 1

An electrically charged filter of a two-layer structure (basis weight: 250 g/m$^2$, thickness: 3.1 mm) having the following composition was obtained by overlaying together respective electrically charged nonwoven fabric layers without bonding.
Upstream side in air passage direction (a): Liquid-charged melt-blown nonwoven fabric having a basis weight of 50 g/m$^2$ (A-1)
Downstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))

Practical Example 2

An electrically charged filter of a two-layer structure (basis weight: 250 g/m$^2$, thickness: 3.1 mm) having the following composition was obtained by overlaying in a similar fashion to Practical Example 1.
Upstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))
Downstream side in air passage direction (a): Liquid-charged melt-blown nonwoven fabric (A-1) having a basis weight of 50 g/m$^2$ Comparative Example 1

An electrically charged filter of a two-layer structure (basis weight: 250 g/m$^2$, thickness: 3.1 mm) having the following composition was obtained by overlaying in a similar fashion to Practical Example 1.
Upstream side in air passage direction (a): Liquid-charged melt-blown nonwoven fabric (A-1) having a basis weight of 50 g/m$^2$
Downstream side in air passage direction (a): Corona-charged needle-punched composite nonwoven fabric having a basis weight of 200 g/m$^2$ (E-1, with the polypropylene spun-bond nonwoven fabric on the downstream side in the air passage direction (a))

Comparative Example 2

An electrically charged filter of a two-layer structure (basis weight: 250 g/m$^2$, thickness: 3.1 mm) having tie following composition was obtained by overlaying in a similar fashion to Practical Example 1.
Upstream side in air passage direction (a): Corona-charged melt-blown nonwoven fabric (B-1) having a basis weight of 50 g/m$^2$
Downstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))

Comparative Example 3

An electrically charged filter of a two-layer structure (basis weight: 250 g/m$^2$, thickness: 2.7 mm) having the following composition was obtained by overlaying in a similar fashion to Practical Example 1.
Upstream side in air passage direction (a): Corona-charged hydroentangled nonwoven fabric (C-1) having a basis weight of 50 g/m$^2$
Downstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))

Comparative Example 4

An electrically charged filter having a one-layer structure (basis weight: 250 g/m$^2$, thickness: 2.9 mm, with a polypropylene spun-bond nonwoven fabric on the downstream side of the air passage direction (a)) was obtained using only a tribo-electrically charged needle-punched composite nonwoven fabric (D-2) having a basis weight of 250 g/m$^2$, Comparative Example 5

An electrically charged filter of a two-layer structure (basis weight: 75 g/m$^2$, thickness: 1.1 mm) having the following composition was obtained by overlaying in a similar fashion to Practical Example 1.
Upstream side in air passage direction (a): Liquid-charged melt-blown nonwoven fabric (A-1) having a basis weight of 50 g/m$^2$
Downstream side in air passage direction (a): Liquid-charged melt-blown nonwoven fabric (A-2) having a basis weight of 25 g/m$^2$ Comparative Example 6

An electrically charged filter of a two-layer structure (basis weight: 250 g/m$^2$, thickness: 3.1 mm) having the following composition was obtained by overlaying in a similar fashion to Practical Example 1.
Upstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))
Downstream side in air passage direction (a): Corona-charged melt-blown nonwoven fabric (B-1) having a basis weight of 50 g/m$^2$ The electrically charged filters according to Practical Examples 1 and 2 and Comparative Examples 1 to 6 obtained as described above were evaluated by the following measurement procedures.

(Method of Measuring Filtering Efficiency)

This measurement was carried out in accordance with the test method specified in Paragraph 6 "Boujin Masuku no Kikaku (Standard for Dust Respirator)" applicable to dust masks (Ministry of Health Labor & Welfare Ordinance No. 88 issued Sep. 11, 2000). Here, a method based on NaCl particles and a method based on a dioctyl phthalate mist are described, but in this case, the evaluation is based on both of these methods.

1. Method of Measuring Filtering Efficiency Based on NaCl Particles

The electrically charged filter was cut into a circular sample having a diameter of 145 mm, and mounted in a designated measurement apparatus (SIBATA Scientific Technology AP-9000). The effective filtering surface area of the circular sample of the electrically charged filter was 124 cm$^2$. An air flow containing NaCl particles was supplied from the upstream side of the measurement sample at a test flow rate of 85 liters per minute, and a particle concentration of no more than 50 mg/m$^3$ (with a variation in concentration of no more than ±15%), using NaCl particles having a median diameter distribution of 0.06 µm to 0.10 µm, and a geometric standard deviation of no more than 1.8. The particle concentration was measured with a light scattering type of dust concentration meter, on the upstream side and the downstream side of the measurement sample, until the supplied amount of NaCl particles reached a total of 100 mg. The filtering efficiency with this supplied amount of NaCl particles was determined from the measurement results and the temporal change in the filtering efficiency was recorded. The closer the value of the filtering efficiency to 100%, the higher the dust filtering efficiency of the electrically charged filter. Furthermore, the smaller the difference between the initial value of the filtering efficiency in the electrically charged filter, and the lowest value of the filtering efficiency recorded before the supplied amount of NaCl particles reached a total of 100 mg, the lower the amount of decline in the filtering efficiency due to dust capture.

2. Method of Measuring Filtering Efficiency Based on Dioctyl Phthalate (DOP) Mist The electrically charged filter was cut into a circular sample having a diameter of 145 mm, and mounted in a designated measurement apparatus (AFT model 8130 made by TSI). The effective filtering surface area of the circular sample of the electrically charged filter was 124 cm$^2$. An air flow containing DOP mist was supplied from the upstream side of the measurement sample at a test flow rate of 85 liters per minute, and a mist concentration of no more than 100 g/m$^3$ (with a variation in concentration of no more than ±15%), using a DOP mist having a median diameter distribution of 0.15 µm to 0.25 µm, and a geometric standard deviation of no more than 1.6. The DOP mist concentration was measured with a light scattering type of dust concentration meter, on the upstream side and the downstream side of the measurement sample, until the supplied amount of DOP reached a total of 200 mg. The filtering efficiency with this supplied amount of DOP was determined from the measurement results and the temporal change in the filtering efficiency was recorded. The closer the value of the filtering efficiency to 100%, the higher the oil mist filtering efficiency of the electrically charged filter. Furthermore, the smaller the difference between the initial value of the filtering efficiency in the electrically charged filter, and the lowest value of the filtering efficiency recorded before the supplied amount of DOP mist reached a total of 200 mg, the lower the amount of decline in the filtering efficiency due to capture of oil mist.

3. Pressure Loss Measurement Method when Capturing NaCl Particles and DOP Particles When the filtering efficiency of the NaCl particles and the DOP particles was measured, a fine differential pressure gauge was used to measure pressure loss at respective measurement points at a test flow rate of 40 liters per minute, and the pressure loss with respect to the captured amount of NaCl particles and DOP particles was determined and recorded as temporal change in the pressure loss (inhalation resistance value). The lower the initial pressure loss and the lower the increase in the pressure loss ("final value of pressure loss"–"initial value of pressure loss") that accompanies the capture of NaCl particles and DOP particles, the better the air permeability.

Figure 3:
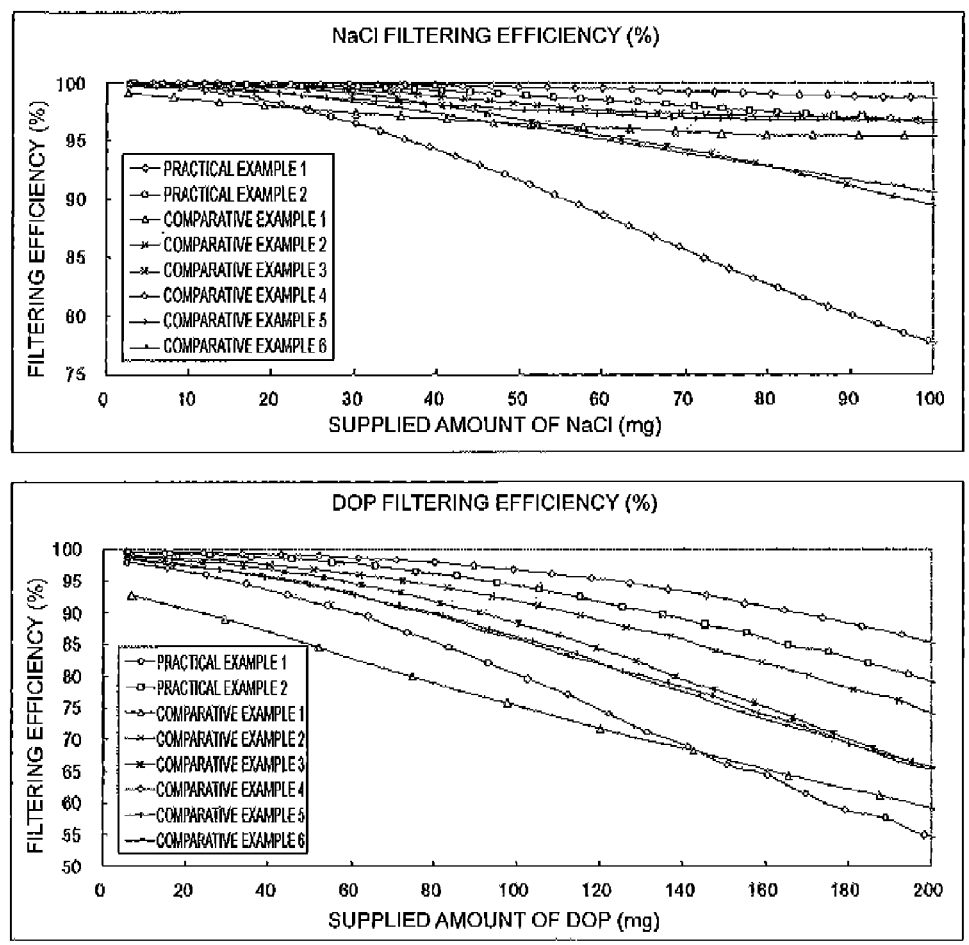
FIG. 3 is a graph showing temporal change in the filtering efficiency of the electrically charged filter in FIG. 1, in the capture of NaCl and DOP.
Figure 4:
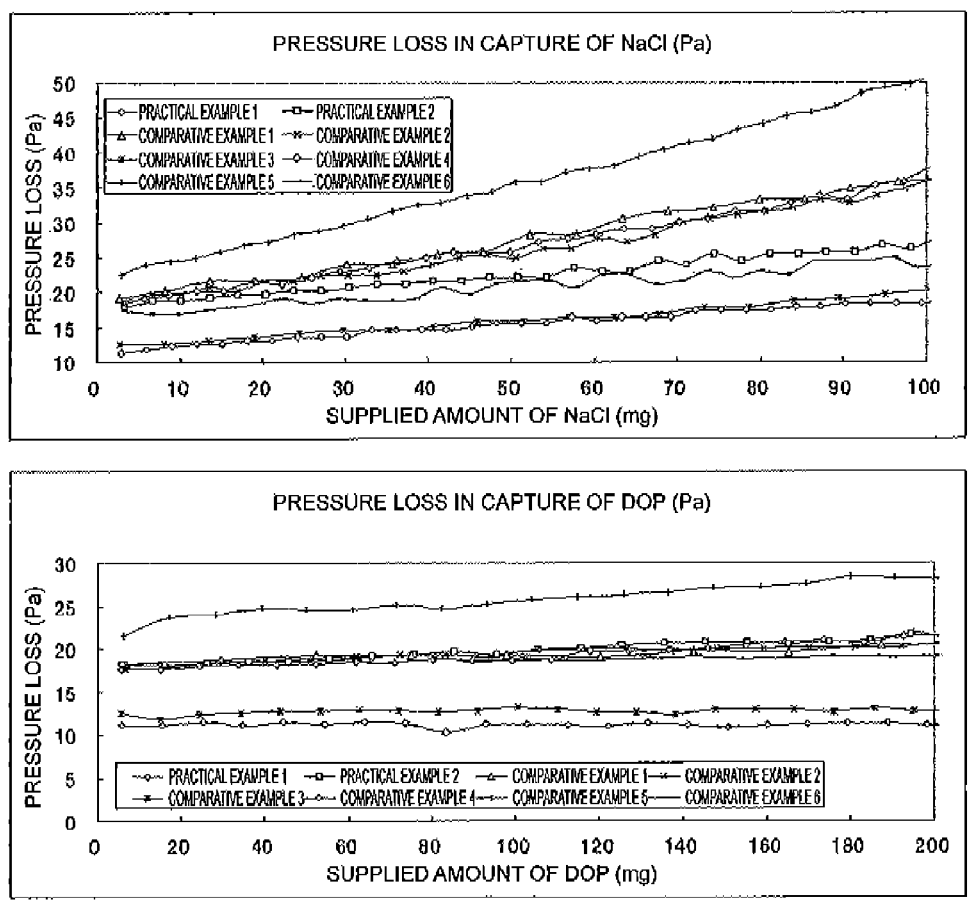
FIG. 4 is a graph showing temporal change in the pressure loss of the electrically charged filter in FIG. 1, in the capture of NaCl and DOP.

Table 1 and FIGS. 3 and 4 show the measurement results for electrically charged filters according to Practical Examples 1 and 2, and Comparative Examples 1 to 6.

TABLE 1

|  |  | Upstream side in air passage direction | Downstream side in air passage direction | DOP filtering efficiency (%) | | NaCl filtering efficiency (%) | | Initial value of pressure loss (Pa) | Final value of pressure loss in case of NaCl capture (Pa) | Final value of pressure loss in case of DOP capture (Pa) |
|---|---|---|---|---|---|---|---|---|---|---|
|  |  |  |  | Initial value | Lowest value | Initial value | Lowest value |  |  |  |
| Practical Example 1 | Filter Charging method | MB Liquid-charged | NP Tribo-electrically charged | 99.64 | 84.80 | 99.97 | 98.64 | 17.8 | 36.2 | 21.5 |
|  | Basis weight (g/m$^2$) | 50 | 200 |  |  |  |  |  |  |  |
| Practical Example 2 | Filter Charging method | NP Tribo-electrically charged | MB Liquid-charged | 99.51 | 78.30 | 99.96 | 96.44 | 17.2 | 27.8 | 21.5 |
|  | Basis weight (g/m$^2$) | 200 | 50 |  |  |  |  |  |  |  |

TABLE 1-continued

| | | Upstream side in air passage direction | Downstream side in air passage direction | DOP filtering efficiency (%) | | NaCl filtering efficiency (%) | | Initial value of pressure loss (Pa) | Final value of pressure loss in case of NaCl capture (Pa) | Final value of pressure loss in case of DOP capture (Pa) |
|---|---|---|---|---|---|---|---|---|---|---|
| | | | | Initial value | Lowest value | Initial value | Lowest value | | | |
| Comparative Example 1 | Filter Charging method | MB Liquid-charged | NP Corona-charged | 92.68 | 58.80 | 99.15 | 95.40 | 18.2 | 38.6 | 20.4 |
| | Basis weight (g/m$^2$) | 50 | 200 | | | | | | | |
| Comparative Example 2 | Filter Charging method | MB Corona-charged | NP Tribo-electrically charged | 98.90 | 73.30 | 99.96 | 96.48 | 17.4 | 35.0 | 19.7 |
| | Basis weight (g/m$^2$) | 50 | 200 | | | | | | | |
| Comparative Example 3 | Filter Charging method | HE Corona-charged | NP Tribo-electrically charged | 98.84 | 64.60 | 99.95 | 89.35 | 11.6 | 20.2 | 13.0 |
| | Basis weight (g/m$^2$) | 50 | 200 | | | | | | | |
| Comparative Example 4 | Filter Charging method | | NP Tribo-electrically charged | 97.80 | 54.10 | 99.80 | 77.24 | 10.0 | 18.8 | 11.2 |
| | Basis weight (g/m$^2$) | | 250 | | | | | | | |
| Comparative Example 5 | Filter Charging method | MB Liquid-charged | MB Liquid-charged | 98.34 | 65.40 | 99.72 | 96.83 | 23.0 | 51.3 | 28.0 |
| | Basis weight (g/m$^2$) | 50 | 25 | | | | | | | |
| Comparative Example 6 | Filter Charging method | NP Tribo-electrically charged | MB Corona-charged | 98.36 | 64.70 | 99.90 | 90.40 | 16.6 | 24.9 | 19.6 |
| | Basis weight (g/m$^2$) | 200 | 50 | | | | | | | |

\* Key to abbreviations:
MB = Melt-blown nonwoven fabric,
NP = needle-punched composite nonwoven fabric,
HE = hydroentangled nonwoven fabric.

The measurement results show that, with the electrically charged filter according to Practical Example 1, the "initial value of filtering efficiency" and the "lowest value of filtering efficiency" in the capture of NaCl particles and DOP mist both show highest values compared to the electrically charged filters according to any one of Comparative Examples 1 to 6, and the decline in faltering efficiency ("initial value of filtering efficiency"–"lowest value of filtering efficiency") also shows a lowest value.

The measurement results show that, with the electrically charged filter according to Practical Example 2, the "initial value of filtering efficiency" and the "lowest value of filtering efficiency" in the capture of NaCl particles and DOP mist both show highest values compared to the electrically charged filters of Comparative Example 1 and Comparative Examples 3 to 6, and the decline in filtering efficiency ("initial value of filtering efficiency"–"lowest value of filtering efficiency") also shows a lowest value. Furthermore, the electrically charged filter according to Practical Example 2 shows smaller values for the "initial value of filtering efficiency", "lowest value of filtering efficiency" and decline in filtering efficiency ("initial value of filtering efficiency"–"lowest value of filtering efficiency") in the capture of DOP mist, than the electrically charged filter according to Comparative Example 2. Moreover, from FIG. 3 and FIG. 4, it can be seen that the electrically charged filter according to Practical Example 2 has similar values to the electrically charged filter according to Comparative Example 2 for the "initial value of filtering efficiency" and "lowest value of filtering efficiency" in the capture of NaCl particles, but has restricted increase in pressure loss due to the capture of NaCl.

From these results, the electrically charged filters according to Practical Examples 1 and 2 are electrically charged filters which have high initial filtering efficiency and are not liable to decline in filtering efficiency, due to having the characteristic of including a liquid-charged nonwoven fabric layer and a tribo-electrically charged nonwoven fabric layer.

Furthermore, the measurement results show that, with the electrically charged filter according to Practical Example 1, the "initial value of filtering efficiency" and the "lowest value of filtering efficiency" in the capture of NaCl particles and DOP mist both show higher values compared to the electrically charged filter according to Practical Example 2, and the decline in filtering efficiency ("initial value of filtering efficiency"−"lowest value of filtering efficiency") shows a lower value.

From these results, it can be seen that the electrically charged filter according to Practical Example 1 is an electrically charged filter which has even higher initial filtering efficiency and which is even less liable to decline in the filtering efficiency, due to the liquid-charged nonwoven fabric layer being located to the upstream side of the tribo-electrically charged nonwoven fabric layer in terms of the air passage direction.

Moreover, even in cases where the object of filtering included an oil mist, the electrically charged filters according to Practical Examples 1 and 2 were electrically charged filters suited to the capture of oil mist, which had a high initial filtering efficiency and were not liable to decline in the filtering efficiency.

Practical Example 3

An electrically charged filter of a three-layer structure (basis weight: 275 g/m$^2$, thickness: 3.4 mm) having the following composition was obtained by overlaying together respective electrically charged nonwoven fabric layers without bonding.
Upstream side in air passage direction (a): Liquid-charged melt-blown nonwoven fabric (A-1) having a basis weight of 50 g/m$^2$
Midstream position in air passage direction (a): Liquid-charged melt-blown nonwoven fabric (A-2) having a basis weight of 25 g/m$^2$
Downstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))

Practical Example 4

An electrically charged filter of a three-layer structure (basis weight: 275 g/m$^2$, thickness: 3.4 mm) having the following composition was obtained by overlaying in a similar fashion to Practical Example 1.
Upstream side in air passage direction (a): Liquid-charged melt-blown nonwoven fabric (A-2) having a basis weight of 25 g/m$^2$
Midstream position in air passage direction (a): Liquid-charged melt-blown nonwoven fabric (A-1) having a basis weight of 50 g/m$^2$
Downstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))

Practical Example 5

An electrically charged filter of a three-layer structure (basis weight: 275 g/m$^2$, thickness: 3.2 mm) having the following composition was obtained by overlaying in a similar fashion to Practical Example 1.
Upstream side in air passage direction (a): Corona-charged hydroentangled nonwoven fabric (C-1) having a basis weight of 50 g/m$^2$
Midstream position in air passage direction (a): Liquid-charged melt-blown nonwoven fabric (A-2) having a basis weight of 25 g/m$^2$
Downstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))

Comparative Example 7

An electrically charged filter of a three-layer structure (basis weight: 275 g/m$^2$, thickness: 3.4 mm) having the following composition was obtained by overlaying in a similar fashion to Practical Example 1.
Upstream side in air passage direction (a): Liquid-charged melt-blown nonwoven fabric (A-1) having a basis weight of 50 g/m$^2$
Midstream position in air passage direction (a): Liquid-charged melt-blown nonwoven fabric (A-2) having a basis weight of 25 g/m$^2$
Downstream side in air passage direction (a): Corona-charged needle-punched composite nonwoven fabric having a basis weight of 200 g/m$^2$ (E-1, with the polypropylene spun-bond nonwoven fabric on the downstream side in the air passage direction (a))

Comparative Example 8

An electrically charged filter of a three-layer structure (basis weight: 275 g/m$^2$, thickness: 3.4 mm) having the following composition was obtained by overlaying in a similar fashion to Practical Example 1.
Upstream side in air passage direction (a): Corona-charged melt-blown nonwoven fabric (B-1) having a basis weight of 50 g/m$^2$
Midstream position in air passage direction (a): Corona-charged melt-blown nonwoven fabric (B-2) having a basis weight of 25 g/m$^2$
Downstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))

Comparative Example 9

An electrically charged filter of a three-layer structure (basis weight: 275 g/m$^2$, thickness: 3.2 mm) having the following composition was obtained by overlaying in a similar fashion to Practical Example 1.
Upstream side in air passage direction (a): Corona-charged hydroentangled nonwoven fabric (C-1) having a basis weight of 50 g/m$^2$
Midstream position in air passage direction (a): Corona-charged melt-blown nonwoven fabric (B-2) having a basis weight of 25 g/m$^2$
Downstream side in air passage direction (a): Tribo-electrically charged needle-punched composite nonwoven fabric having a basis weight of 200 g/m$^2$ (D-1, with the polypropylene spun-bond nonwoven fabric on the downstream side in the air passage direction (a))

Comparative Example 10

An electrically charged filter of a three-layer structure (basis weight: 280 g/m$^2$, thickness: 3.3 mm) having the following composition was obtained by overlaying in a similar fashion to Practical Example 1.

Upstream side in air passage direction (a): Corona-charged hydroentangled nonwoven fabric (C-1) having a basis weight of 50 g/m²

Midstream position in air passage direction (a): Corona-charged melt-blown nonwoven fabric (B-1) having a basis weight of 50 g/m²

Downstream side in air passage direction (a): Tribo-electrically charged needle-punched composite nonwoven fabric having a basis weight of 180 g/m² (D-3, with the polypropylene spun-bond nonwoven fabric on the downstream side in the air passage direction (a))

Comparative Example 11

An electrically charged filter having a one-layer structure (basis weight: 275 g/m², thickness: 3.1 mm, with a polypropylene spun-bond nonwoven fabric on the downstream side of the air passage direction (a)) was obtained using only a tribo-electrically charged needle-punched nonwoven fabric (D-4) having a basis weight of 275 g/m².

Comparative Example 12

An electrically charged filter of a three-layer structure (basis weight: 125 g/m², thickness: 1.6 mm) having the following composition was obtained by overlaying in a similar fashion to Practical Example 1.

Upstream side in air passage direction (a): Liquid-charged melt-blown nonwoven fabric (A-1) having a basis weight of 50 g/m²

Midstream position in air passage direction (a): Liquid-charged melt-blown nonwoven fabric (A-2) having a basis weight of 25 g/m²

Downstream side in air passage direction (a): Liquid-charged melt-blown nonwoven fabric (A-1) having a basis weight of 50 g/m²

Figure 5:
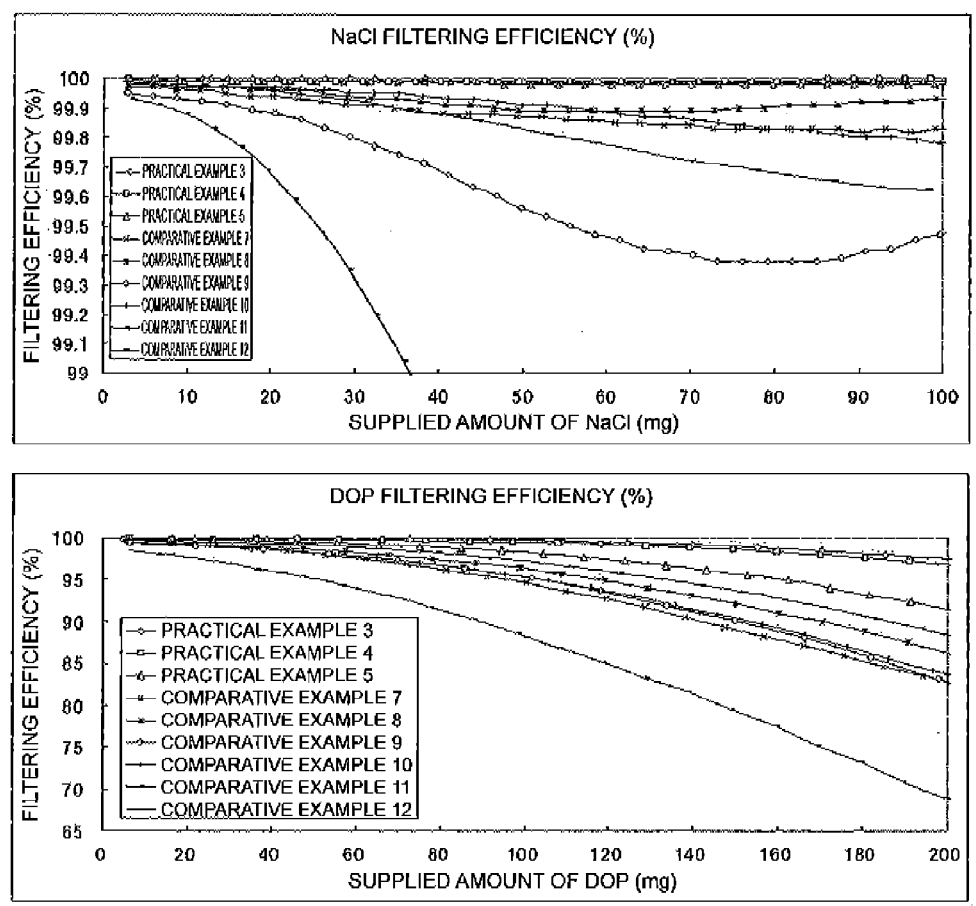
FIG. 5 is a graph showing temporal change in the filtering efficiency of the electrically charged filter in FIG. 2, in the capture of NaCl and DOP.
Figure 6:
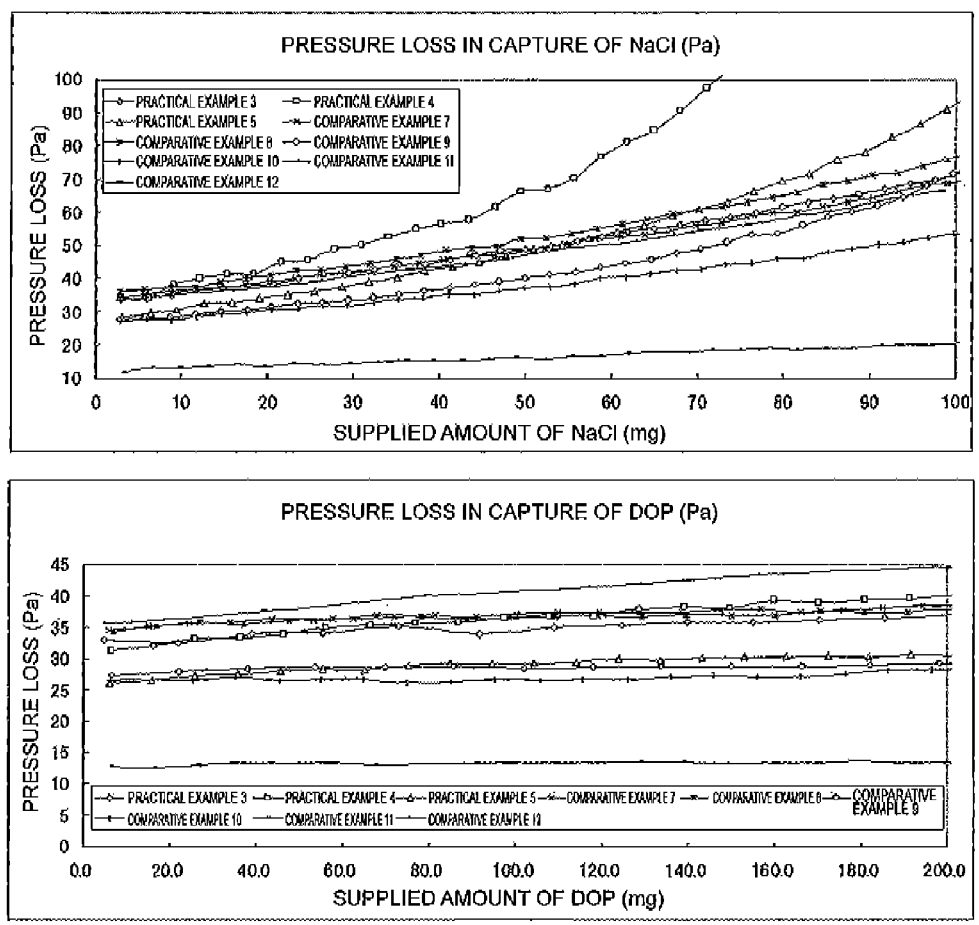
FIG. 6 is a graph showing temporal change in the pressure loss of to the electrically charged filter in FIG. 2, in the capture of NaCl and DOP.

Table 2 and FIGS. 5 and 6 show a summary of the measurement results obtained by measuring the electrically charged filters according to Practical Examples 3 to 5 and Comparative Examples 7 to 12, in a similar fashion to that described in the "Method of measuring filtering efficiency".

TABLE 2

| | | Upstream side in air passage direction | Midstream position in air passage direction | Downstream side in air passage direction | DOP filtering efficiency (%) | | NaCl filtering efficiency (%) | | Initial value of pressure loss (Pa) | Final value of pressure loss in case of NaCl capture (Pa) | Final value of pressure loss in case of DOP capture (Pa) |
|---|---|---|---|---|---|---|---|---|---|---|---|
| | | | | | Initial value | Lowest value | Initial value | Lowest value | | | |
| Practical Example 3 | Filter Charging method | MB Liquid-charged | MB Liquid-charged | NP Tribo-electrically charged | 99.90 | 97.41 | 100.00 | 99.99 | 32.0 | 72.0 | 36.8 |
| | Basis weight (g/m²) | 50 | 25 | 200 | | | | | | | |
| Practical Example 4 | Filter Charging method | MB Liquid-charged | MB Liquid-charged | NP Tribo-electrically charged | 99.94 | 96.73 | 100.00 | 99.99 | 34.0 | 219.0 | 40.0 |
| | Basis weight (g/m²) | 25 | 50 | 200 | | | | | | | |
| Practical Example 5 | Filter Charging method | HE Corona-charged | MB Liquid-charged | NP Tribo-electrically charged | 99.85 | 91.35 | 100.00 | 99.98 | 26.8 | 96.0 | 30.4 |
| | Basis weight (g/m²) | 50 | 25 | 200 | | | | | | | |
| Comparative Example 7 | Filter Charging method | MB Liquid-charged | MB Liquid-charged | NP Corona-charged | 99.48 | 82.30 | 99.97 | 99.82 | 33.5 | 70.1 | 38.5 |
| | Basis weight (g/m²) | 50 | 25 | 200 | | | | | | | |
| Comparative Example 8 | Filter Charging method | MB Corona-charged | MB Corona-charged | NP Tribo-electrically charged | 99.38 | 86.10 | 99.98 | 99.89 | 35.1 | 78.1 | 37.9 |
| | Basis weight (g/m²) | 50 | 25 | 200 | | | | | | | |
| Comparative Example 9 | Filter Charging method | HE Corona-charged | MB Corona-charged | NP Tribo-electrically charged | 99.32 | 82.50 | 99.95 | 99.38 | 29.0 | 74.4 | 29.5 |
| | Basis weight (g/m²) | 50 | 25 | 200 | | | | | | | |

TABLE 2-continued

| | | Upstream side in air passage direction | Midstream position in air passage direction | Downstream side in air passage direction | DOP filtering efficiency (%) | | NaCl filtering efficiency (%) | | Initial value of pressure loss (Pa) | Final value of pressure loss in case of NaCl capture (Pa) | Final value of pressure loss in case of DOP capture (Pa) |
|---|---|---|---|---|---|---|---|---|---|---|---|
| | | | | | Initial value | Lowest value | Initial value | Lowest value | | | |
| Comparative Example 10 | Filter Charging method | HE Corona-charged | MB Corona-charged | NP Tribo-electrically charged | 99.42 | 83.40 | 99.98 | 99.77 | 26.2 | 54.1 | 28.1 |
| | Basis weight (g/m²) | 50 | 50 | 180 | | | | | | | |
| Comparative Example 11 | Filter Charging method | | | NP Tribo-electrically charged | 98.52 | 68.10 | 99.93 | 92.77 | 11.3 | 21.0 | 13.7 |
| | Basis weight (g/m²) | | | 275 | | | | | | | |
| Comparative Example 12 | Filter Charging method | MB Liquid-charged | MB Liquid-charged | MB Liquid-charged | 99.74 | 88.00 | 99.99 | 99.62 | 32.2 | 64.3 | 45.9 |
| | Basis weight (g/m²) | 50 | 25 | 50 | | | | | | | |

\* Key to abbreviations:
MB = Melt-blown nonwoven fabric,
NP = needle-punched composite nonwoven fabric,
HE = hydroentangled nonwoven fabric The measurement results show that, with the electrically charged filters according to Practical Examples 3 to 5, the "initial value of filtering efficiency" and the "lowest value of filtering efficiency" in the capture of NaCl particles and DOP mist both show higher values compared to the electrically charged filters according to any one of Practical Example 1 and Comparative Examples 7 to 12, and the decline in filtering efficiency ("initial value of filtering efficiency"–"lowest value of filtering efficiency") also shows a lower value.

From these results, it can be seen that the electrically charged filters according to Practical Examples 3 to 5 are electrically charged filters which have higher initial filtering efficiency and are less liable to decline in filtering efficiency, due to having a liquid-charged nonwoven fabric layer and a tribo-electrically charged nonwoven fabric layer in the case of the electrically charged filters according to Practical Examples 3 to 5, and in particular, due to having two liquid-charged nonwoven fabric layers with both of the liquid-charged nonwoven fabric layers being located to the upstream side of the tribo-electrically charged nonwoven fabric layer in terms of the air passage direction (a) in the case of the electrically charged filters according to Practical Examples 3 and 4.

Furthermore, it can also be seen that the electrically charged filter according to Practical Example 3 is an electrically charged filter which is less liable to produce pressure loss than the electrically charged filter according to Practical Example 4, due to the liquid-charged nonwoven fabric layer which is located furthest to the upstream side in the air passage direction being made of fibers having a larger fiber diameter than the liquid-charged nonwoven fabric layer which is located to the downstream side.

Moreover, even in cases where the object of filtering included an oil mist, the electrically charged filters according to Practical Examples 3 to 5 were electrically charged filters suited to the capture of oil mist, which had a higher initial filtering efficiency and were less liable to decline in the filtering efficiency.

INDUSTRIAL APPLICABILITY

The electrically charged filter relating to the present invention is an electrically charged filter and a mask which has a high initial filtering efficiency and is not liable to decline in filtering efficiency, due to incorporating further improvement in an electrostatic capturing action.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

1 mask
10 electrically charged filter
11 liquid-charged nonwoven fabric layer
12 tribo-electrically charged nonwoven fabric layer
13 other liquid-charged nonwoven fabric layer
a air passage direction

The invention claimed is:
1. An electrically charged filter, comprising:
  a liquid-charged nonwoven fabric layer that is charged by application of a force via a polar liquid; and
  a tribo-electrically charged nonwoven fabric layer that is charged by friction between fiber components of a plurality of types, wherein the tribo-electrically charged nonwoven fabric layer comprises fibers made from a polyolefin resin and fibers made from an acrylic resin, wherein the acrylic resin has a circular fiber cross-section, and wherein an average diameter of fibers constituting the liquid-charged nonwoven fabric layer is no less than 3 μm and no more than 6 μm.

2. The electrically charged filter according to claim 1, comprising a plurality of the liquid-charged nonwoven fabric layers and a plurality of the tribo-electrically charged nonwoven fabric layers.

3. The electrically charged filter according to claim 1, wherein the liquid-charged nonwoven fabric layer is located to an upstream side of the tribo-electrically charged nonwoven fabric layer in terms of an air passage direction.

4. A mask comprising an electrically charged filter, the electrically charged filter comprising:

a liquid-charged nonwoven fabric layer that is charged by application of a force via a polar liquid; and a tribo-electrically charged nonwoven fabric layer that is charged by friction between fiber components of a plurality of types, wherein the tribo-electrically charged nonwoven fabric layer comprises fibers made from a polyolefin resin and fibers made from an acrylic resin, wherein the acrylic resin has a circular fiber cross-section, and wherein an average diameter of fibers constituting the liquid-charged nonwoven fabric layer is no less than 3 μm and no more than 6 μm.

5. The electrically charged filter according to claim 1, comprising a plurality of the liquid-charged nonwoven fabric layers.

6. The electrically charged filter according to claim 1, comprising a plurality of the tribo-electrically charged nonwoven fabric layers.

* * * * *